J. Y. SLATER.
Separating Wool and Cotton and Similar Animal and Vegetable Fibers from Fabrics.

No. 202,672. Patented April 23, 1878.

Witnesses,
David G. Weems
W. A. Bertram

Inventor
John Y. Slater.
by R. D. Williams
Attorney.

UNITED STATES PATENT OFFICE.

JOHN Y. SLATER, OF BALTIMORE, MARYLAND.

IMPROVEMENT IN SEPARATING WOOL AND COTTON AND SIMILAR ANIMAL AND VEGETABLE FIBERS FROM FABRICS.

Specification forming part of Letters Patent No. 202,672, dated April 23, 1878; application filed March 26, 1878.

*To all whom it may concern:*

Be it known that I, JOHN Y. SLATER, of the city of Baltimore, State of Maryland, have invented certain new and useful Improvements in Apparatus for Treating Mixed Fiber; and I hereby declare the same to be fully, clearly, and exactly described as follows, reference being had to the accompanying drawings, in which—

Figure 1:
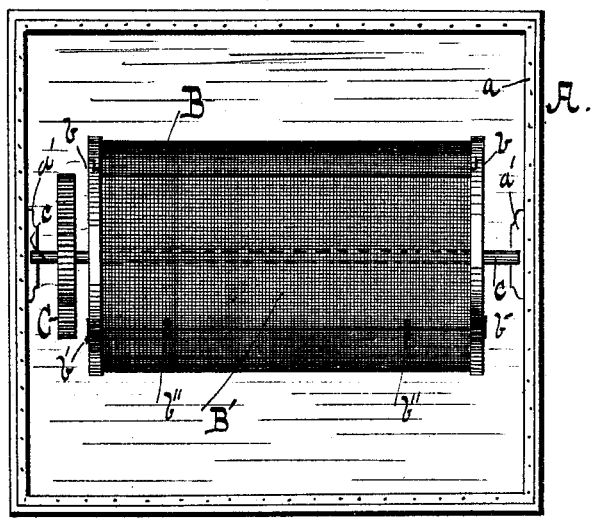
Figure 2:
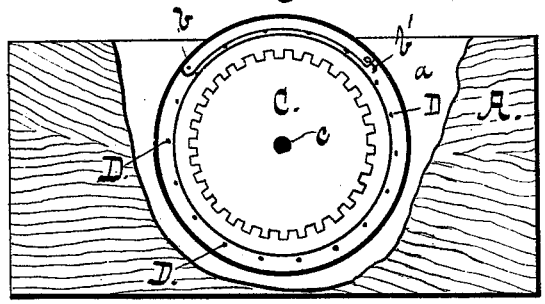

Figure 1 is a plan view, and Fig. 2 a side elevation, of the device.

This invention has reference to those processes for separating animal from vegetable fiber depending upon the solution of the latter in mineral acids, hydrochlorine being the solvent usually employed.

Great difficulty has been experienced in carrying out the above processes, arising from the difficulty of providing apparatus suitable for the purpose. Those metals which are practically unattacked by the acids are inapplicable for constructing the apparatus, being either too costly or otherwise unsuited for the purpose.

The apparatus hereinafter described fully answers every requisite. It is efficient in operation, not costly, and practically unattacked by the dilute acid used in carrying out the process for which it is designed.

In the accompanying drawings, A represents a suitable wooden tank, lined throughout with sheet-lead $a$, lead-soldered at the joints similar to the chambers employed in the manufacture of sulphuric acid. Leaden bearings $a'$ $a'$ are secured at either side by means of leaden bolts, and are adapted to sustain the shaft $c$. Upon the latter is mounted a cylindrical cage, B, brazen throughout, not a particle of any other metal being used in its construction. The said cage is preferably cylindrical in form, the ends of the cylinder being joined by rods D D, upon which rests and is secured the brass wire-gauze cover, as shown.

A portion, B', of the cylindrical surface is hinged to the rest, as shown at $b$ $b$, and is provided with catches $b'$ $b'$ upon the hinged portions of the rim, similar catches $b''$ $b''$ being provided upon the gauze portion in order to prevent the same from sagging.

A gear-wheel, C, is mounted upon the shaft $c$, of which a sufficient length is left free at either end of the cylinder to attach hooks or grapplings for lifting the cage from the tank.

In operation, the rags, &c., of mixed fiber are introduced into the cage, the tank A being partially filled with dilute acid, which is heated by means of a steam coil of lead pipe, or in any other convenient manner. The cage B is then caused to revolve by gearing (not shown) engaging with the wheel C. When the solution of the vegetable fiber is complete the cage B is lifted clear of the tank and allowed to drain. The contents of the cage being next thoroughly washed, preferably by revolving the cage in pure water, they are removed from the cage and dried in any convenient drying apparatus.

It is found in practice that the brass cage is practically unattacked by the dilute acid, and possesses the essential requisites of strength, stiffness, and cheapness.

Care should be taken to keep the bearings $a'$ properly lubricated, or preferably insulated by means of a piece of greasy leather, in order to prevent galvanic action due to the contact of the two metals.

As before stated, the tank is lined with a continuous coat of sheet-lead, and the cage is made of brass throughout.

Having thus described my invention, what I claim as new, and desire to secure by Letters Patent, is—

1. The process herein described of recovering animal fiber from fabrics of mixed animal and vegetable fiber, the same consisting in subjecting the mixed fiber in a revolving cage to the action of heated dilute acid, and finally washing and drying the residual animal fiber, as set forth.

2. In combination with the lead-lined tank A, the cage B, brazen throughout, substantially as described.

3. In combination with the tank A, the cylindrical cage B, having hinged cover B' and longitudinal supporting-rods D, substantially as described.

JNO. Y. SLATER.

Witnesses:
R. D. WILLIAMS,
DAVID G. WEEMS.